US012735043B2

(12) United States Patent
Zeiynali Farid et al.

(10) Patent No.: US 12,735,043 B2
(45) Date of Patent: Sep. 15, 2026

(54) DETECTING LANE CHANGES BASED ON COLLECTIVE MOTION PATTERN MISMATCH

(71) Applicant: TOYOTA MOTOR ENGINEERING & MANUFACTURING NORTH AMERICA, INC., Plano, TX (US)

(72) Inventors: Yashar Zeiynali Farid, San Jose, CA (US); Maryam Khabazi, Mountain View, CA (US); Lu Xu, Canton, MI (US); Chunghan Lee, Mountain View, CA (US); Emrah Akin Sisbot, Menlo Park, CA (US); Yusuke Takeuchi, Cupertino, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/063,942

(22) Filed: Feb. 26, 2025

(65) Prior Publication Data

US 2026/0249851 A1 Aug. 27, 2026

(51) Int. Cl.

*B60W 30/18* (2012.01)
*B60W 40/10* (2012.01)

(Continued)

(52) U.S. Cl.

CPC ...... *B60W 30/18163* (2013.01); *B60W 40/10* (2013.01); *G01C 21/3492* (2013.01);

(Continued)

(58) Field of Classification Search

None

See application file for complete search history.

(56) References Cited

U.S. PATENT DOCUMENTS 11,023,753 B2 6/2021 Vladimerou
2020/0050195 A1 2/2020 Gross (Continued)

FOREIGN PATENT DOCUMENTS

CN 117633519 A * 3/2024 ........... G06N 3/0464
DE 10118265 A1 * 10/2002 ........... G01S 13/931

OTHER PUBLICATIONS

Zheng et al., "Lane-Change Detection From Steering Signal Using Spectral Segmentation and Learning-Based Classification," IEEE Transactions on Intelligent Vehicles, 2(1):14-24, Mar. 2017 (https://doi.org/10.1109/TIV.2017.2708600).

Sakr et al., "Lane Change Detection Using V2V Safety Messages," 21st International Conference on Intelligent Transportation Systems (ITSC 2018), Nov. 2018, pp. 3967-3973 (https://doi.org/10.1109/ITSC.2018.8569690).

(Continued)

*Primary Examiner* — Peter D Nolan
*Assistant Examiner* — Michael F Whalen
(74) *Attorney, Agent, or Firm* — SHEPPARD, MULLIN, RICHTER & HAMPTON LLP; Daniel N. Yannuzzi

(57) ABSTRACT

Systems and methods are provided for detecting lane changes are provided. An example method may comprise: (1) determining an individual motion profile for a first vehicle as the first vehicle traverses a road segment; (2) based on a comparison between the individual motion profile for the first vehicle and a historical collective motion profile for the road segment, determining the first vehicle changed lanes while traversing the road segment; and (3) responsive to determining the first vehicle changed lanes while traversing the road segment, at least one of: (a) controlling at least one of the first vehicle or a second vehicle traversing the road segment based on the determined lane change of the first vehicle, or (b) updating a lane-level traffic map for the road segment based on the determined lane change of the first vehicle.

20 Claims, 12 Drawing Sheets

(51) Int. Cl.

*G01C 21/00* (2006.01)
*G01C 21/34* (2006.01)
*G06V 20/56* (2022.01)

(52) U.S. Cl.

CPC ..... *G01C 21/3807* (2020.08); *G01C 21/3819* (2020.08); *G01C 21/3822* (2020.08); *B60W 2520/125* (2013.01); *B60W 2520/14* (2013.01); *B60W 2554/408* (2020.02); *B60W 2556/10* (2020.02); *G06V 20/588* (2022.01)

(56) References Cited

U.S. PATENT DOCUMENTS

2020/0327807 A1 * 10/2020 Kamrani ................ G07C 5/085
2025/0076078 A1 * 3/2025 Kappi ................ G01C 21/3844

OTHER PUBLICATIONS

Avci et al., “Detection of Driver Styles in Lane Changes using Wavelet Transform,” Journal of Universal Computer Science, 30(5):590-602, May 28, 2024 (https://doi.org/10.3897/jucs.108073).

Bhattacharyya et al., “A Novel Framework for Detecting Dangerously Slow Vehicle on Highway Corridor in a Partially Connected Environment,” TRB Annual Meeting, Jan. 2023, 1 page (https://theses.hal.science/ENTPE/hal-04638393v1).

Ali et al., “Detecting, Analysing, and Modelling Failed Lane-Changing Attempts in Traditional and Connected Environments,” Analytic Methods in Accident Research, 28:100138, Dec. 2020, pp. 1-38 (https://doi.org/10.1016/j.amar.2020.100138).

Wang et al., “A Picture is Worth a Thousand Words: Share Your Real-Time View on the Road,” IEEE Transactions on Vehicular Technology, 66(4):2902-2914 (https://doi.org/10.1109/TVT.2016.2592685).

* cited by examiner

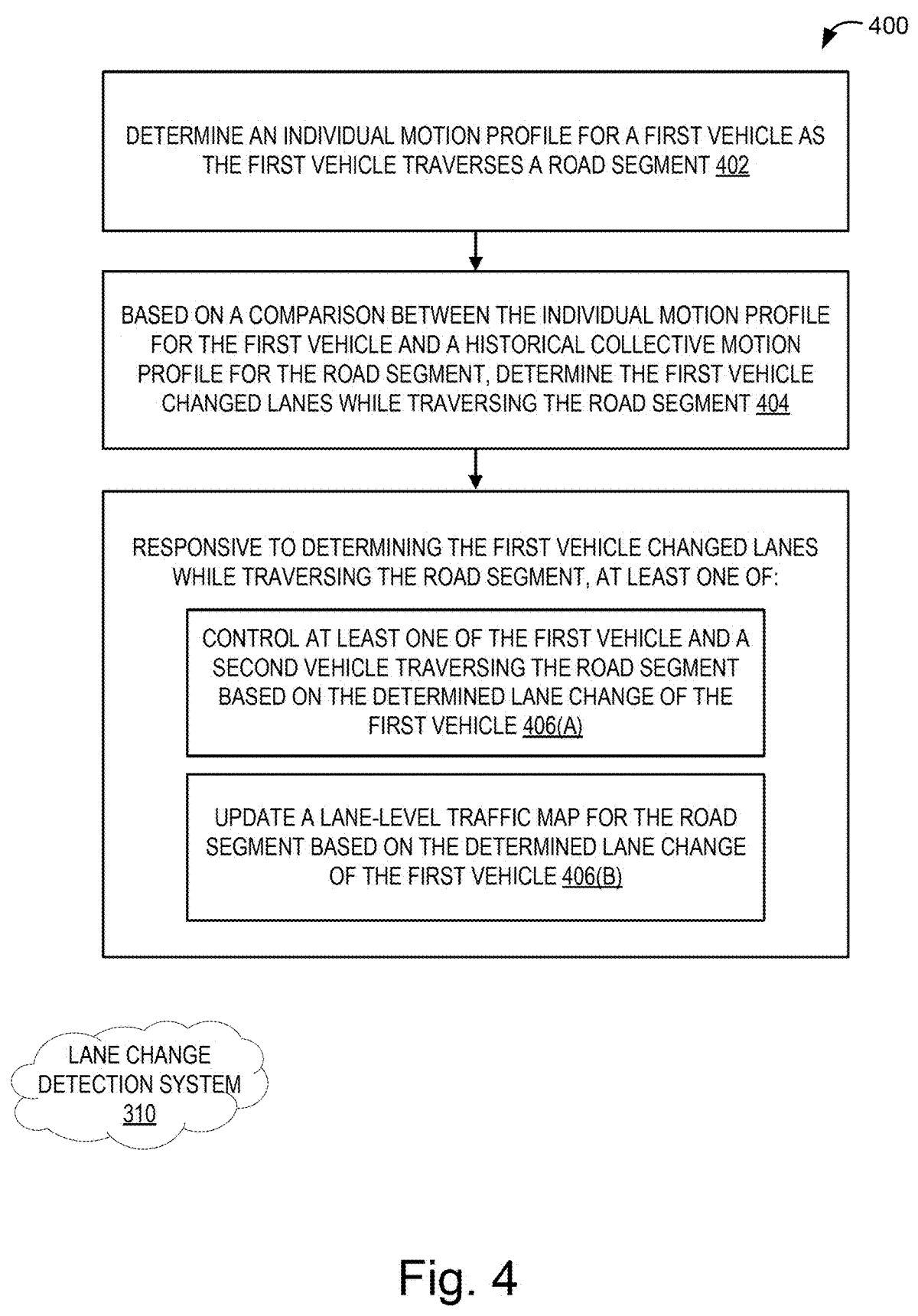

400

DETERMINE AN INDIVIDUAL MOTION PROFILE FOR A FIRST VEHICLE AS THE FIRST VEHICLE TRAVERSES A ROAD SEGMENT 402

BASED ON A COMPARISON BETWEEN THE INDIVIDUAL MOTION PROFILE FOR THE FIRST VEHICLE AND A HISTORICAL COLLECTIVE MOTION PROFILE FOR THE ROAD SEGMENT, DETERMINE THE FIRST VEHICLE CHANGED LANES WHILE TRAVERSING THE ROAD SEGMENT 404

RESPONSIVE TO DETERMINING THE FIRST VEHICLE CHANGED LANES WHILE TRAVERSING THE ROAD SEGMENT, AT LEAST ONE OF:

CONTROL AT LEAST ONE OF THE FIRST VEHICLE AND A SECOND VEHICLE TRAVERSING THE ROAD SEGMENT BASED ON THE DETERMINED LANE CHANGE OF THE FIRST VEHICLE 406(A)

UPDATE A LANE-LEVEL TRAFFIC MAP FOR THE ROAD SEGMENT BASED ON THE DETERMINED LANE CHANGE OF THE FIRST VEHICLE 406(B)

LANE CHANGE DETECTION SYSTEM 310

Fig. 4

Figure 5A:
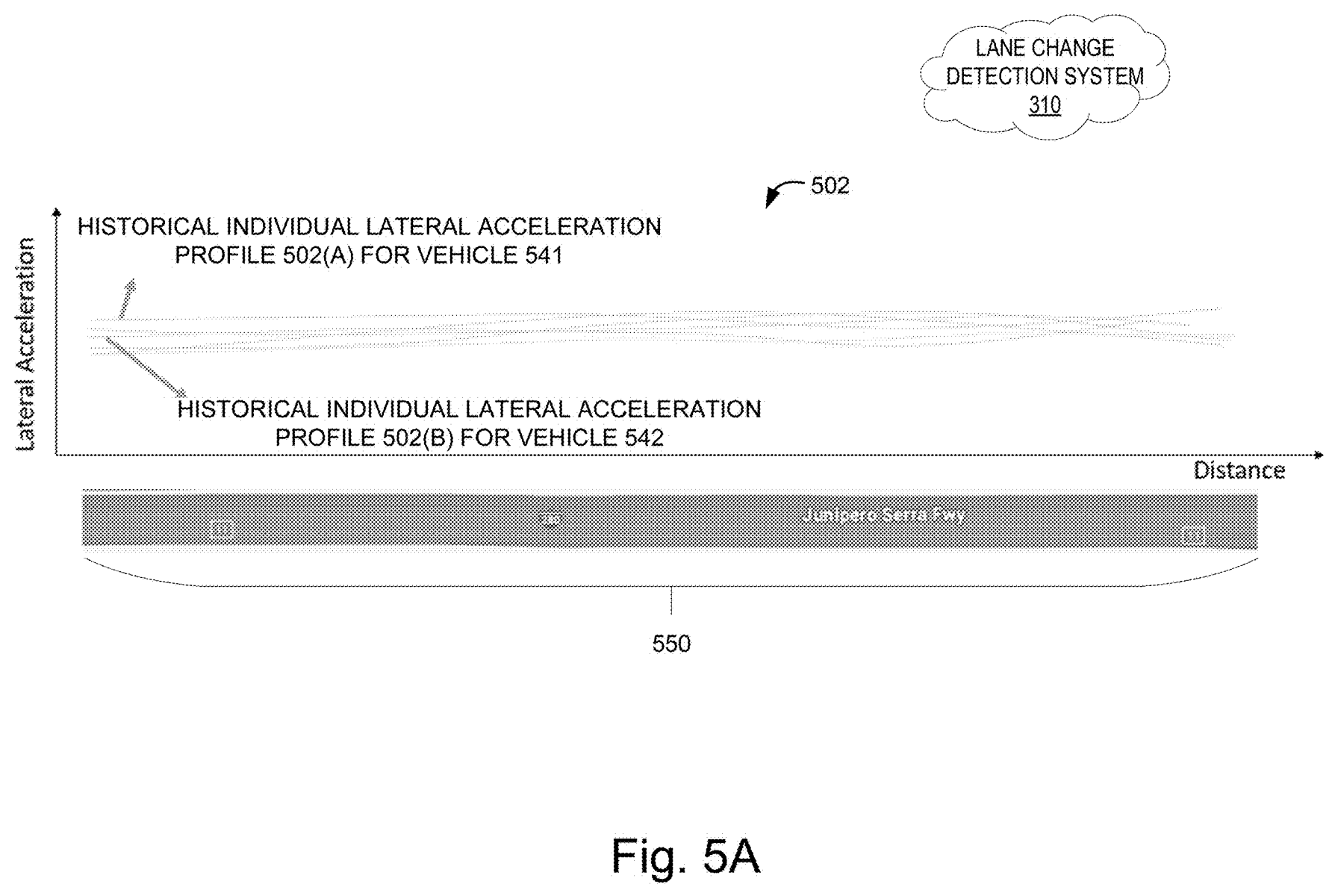

LANE CHANGE DETECTION SYSTEM 310

502

HISTORICAL INDIVIDUAL LATERAL ACCELERATION PROFILE 502(A) FOR VEHICLE 541

HISTORICAL INDIVIDUAL LATERAL ACCELERATION PROFILE 502(B) FOR VEHICLE 542

Distance

Lateral Acceleration

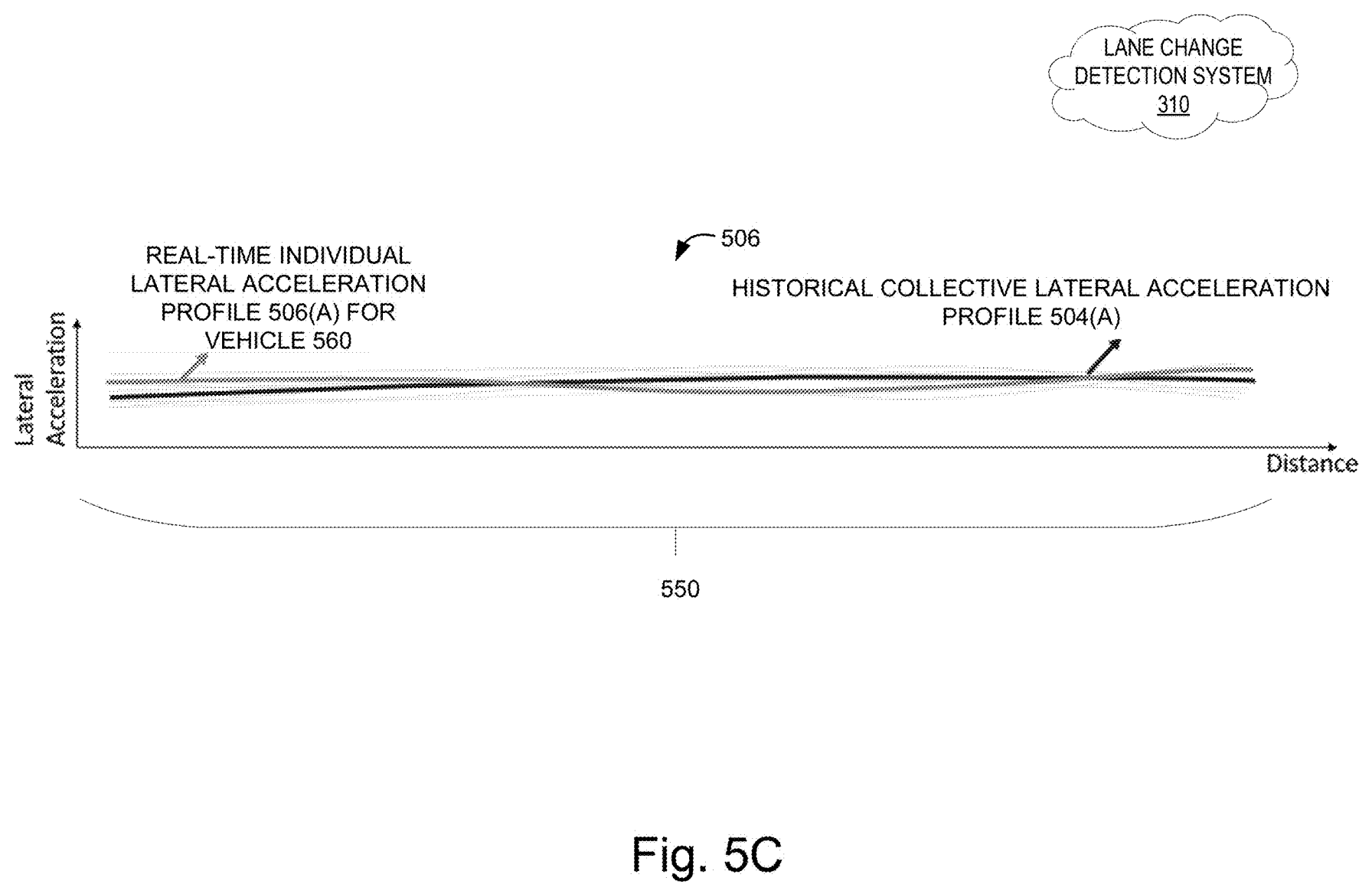

LANE CHANGE DETECTION SYSTEM 310

Distance

HISTORICAL COLLECTIVE LATERAL ACCELERATION PROFILE 504(A)

506

550

REAL-TIME INDIVIDUAL LATERAL ACCELERATION PROFILE 506(A) FOR VEHICLE 560

Lateral Acceleration

Fig. 5C

DETECTING LANE CHANGES BASED ON COLLECTIVE MOTION PATTERN MISMATCH

TECHNICAL FIELD

The present disclosure relates generally to automotive systems and technologies. More particularly, some embodiments relate to detecting lane changes of vehicles.

DESCRIPTION OF RELATED ART

Various systems rely on (or otherwise benefit from) accurate and rapid detection of lane changes by vehicles.

For example, lane-level traffic map generation systems/lane-level traffic estimation systems can update more rapidly and accurately based on rapidly and accurately detected lane changes. In turn, human drivers (or autonomous driving systems as described below) relying on such lane-level traffic maps/estimations can make more rapid and improved decisions.

As another example, autonomous driving systems can make improved decisions based on rapidly and accurately detected lane changes. For instance, an autonomous driving system may make evasive/safety maneuvers more rapidly or more effectively in response to accurately and rapidly detected lane changes. Relatedly, the autonomous driving system can make maneuvers to improve traffic efficiency on a road segment based on rapidly and accurately detected lane changes. In some cases, such maneuvers may be informed by an above-referenced lane-level traffic map/estimate.

BRIEF SUMMARY OF THE DISCLOSURE

According to various embodiments of the presently disclosed technology, a method is provided. The method may comprise: (1) determining an individual motion profile for a first vehicle as the first vehicle traverses a road segment; (2) based on a comparison between the individual motion profile for the first vehicle and a historical collective motion profile for the road segment, determining the first vehicle changed lanes while traversing the road segment; and (3) responsive to determining the first vehicle changed lanes while traversing the road segment, at least one of: (a) controlling at least one of the first vehicle or a second vehicle traversing the road segment based on the determined lane change of the first vehicle, or (b) updating a lane-level traffic map for the road segment based on the determined lane change of the first vehicle.

In some embodiments of the method, the method may further comprise determining the historical collective motion profile by: (a) determining historical individual motion profiles for the road segment over time, wherein a respective historical individual motion profile represents motion of a respective vehicle as the respective vehicle traversed the road segment at a time prior to the first vehicle; and (b) determining the historical collective motion profile for the road segment based on the historical individual motion profiles. Here, determining the historical collective motion profile for the road segment based on the historical individual motion profiles may comprise computing the historical collective motion profile as an average of the historical individual motion profiles. In some of such embodiments, the individual lateral acceleration profile for the first vehicle may comprise a representation of lateral acceleration of the first vehicle as a function of distance over a length of the road segment. Relatedly, the respective historical individual motion profile may comprise a representation of lateral acceleration of the respective vehicle as the respective vehicle traversed the road segment at the time prior to the first vehicle.

In certain embodiments of the method, determining the individual motion profile for the first vehicle may comprise: (a) correlating real-time GPS data of the first vehicle to map data including the road segment to determine the first vehicle is traversing the road segment; and (b) responsive to determining the first vehicle is traversing the road segment, determining the individual motion profile for the first vehicle based on real-time motion-related data acquired from the first vehicle as the first vehicle traverses the road segment. In some of such embodiments, the real-time motion-related data may comprise at least one of: (i) real-time lateral acceleration data of the first vehicle as the first vehicle traverses the road segment; (ii) real-time yaw rate data of the first vehicle as the first vehicle traverses the road segment; (iii) real-time heading data of the first vehicle as the first vehicle traverses the road segment; (iv) real-time accelerometer data of the first vehicle as the first vehicle traverses the road segment; (v) real-time steering wheel angle data of the first vehicle as the first vehicle traverses the road segment; or (vi) real-time speed data of the first vehicle as the first vehicle traverses the road segment.

In various embodiments of the method, determining the first vehicle changed lanes while traversing the road segment may comprise: (a) using a statistical model to detect a mismatch between the individual motion profile for the first vehicle and the historical collective motion profile for the road segment; and (b) determining the first vehicle changed lanes based on the detected mismatch. In some of such embodiments, the statistical model may comprise an autoregressive integrated moving average (ARIMA) model.

In certain embodiments of the method, determining the first vehicle changed lanes while traversing the road segment may comprise: (a) using a statistical model to detect a mismatch between the individual motion profile for the first vehicle and the historical collective motion profile for the road segment; (b) identifying the first vehicle as a potential lane change candidate for the road segment based on the detected mismatch; and (c) responsive to identifying the first vehicle as the potential lane change candidate, verifying the first vehicle changed lanes while traversing the road segment using analysis of additional data. In some of such embodiments, the additional data may comprise at least one of: (i) real-time turning signal operation data acquired from the first vehicle as the first vehicle traverses the road segment; (ii) real-time lateral position data acquired from the first vehicle as the first vehicle traverses the road segment; (iii) real-time image data acquired from the first vehicle as the first vehicle traverses the road segment; or (iv) real-time image data capturing the first vehicle, acquired from other vehicles proximate the first vehicle as the other vehicles traverse the road segment with the first vehicle. In various of such embodiments, the real-time image data capturing the first vehicle, acquired from the other vehicles, may comprise at least one of: (A) real-time image data capturing operation of a turning signal of the first vehicle; or (B) real-time image data capturing lateral position of the first vehicle relative to lane boundaries of the road segment.

In some embodiments of the method, the road segment may comprise a curved road segment.

In various embodiments of the presently disclosed technology, a system is provided. The system may comprise: (1) one or more processors; and (2) memory storing machine-readable instructions that, when executed by the one or more processors, cause the system to: (a) determine an individual motion profile for a first vehicle as the first vehicle traverses a road segment; (b) based on a comparison between the individual motion profile for the first vehicle and a historical collective motion profile for the road segment, determine the first vehicle changed lanes while traversing the road segment; and (c) responsive to determining the first vehicle changed lanes while traversing the road segment, control at least one of the first vehicle or a second vehicle traversing the road segment based on the determined lane change of the first vehicle.

In some embodiments of the system, the memory may store further machine-readable instructions that, when executed by the one or more processors, cause the system to: (a) determine historical individual motion profiles for the road segment over time, wherein a respective historical individual motion profile represents motion of a respective vehicle as the respective vehicle traversed the road segment at a time prior to the first vehicle; and (b) determine the historical collective motion profile for the road segment based on the historical individual motion profiles. In certain of such embodiments, determining the historical collective motion profile for the road segment based on the historical motion acceleration profiles may comprise computing the historical collective motion profile as an average of the historical individual motion profiles.

In various embodiments of the system, determining the individual motion profile for the first vehicle may comprise: (a) correlating real-time GPS data of the first vehicle to map data including the road segment to determine the first vehicle is traversing the road segment; and (b) responsive to determining the first vehicle is traversing the road segment, determining the individual motion profile for the first vehicle based on real-time motion-related data acquired from the first vehicle as the first vehicle traverses the road segment. In some of such embodiments, the real-time motion-related data may comprise at least one of: (i) real-time lateral acceleration data of the first vehicle as the first vehicle traverses the road segment; (ii) real-time yaw rate data of the first vehicle as the first vehicle traverses the road segment; (iii) real-time heading data of the first vehicle as the first vehicle traverses the road segment; (iv) real-time accelerometer data of the first vehicle as the first vehicle traverses the road segment; (v) real-time steering wheel angle data of the first vehicle as the first vehicle traverses the road segment; or (vi) real-time speed data of the first vehicle as the first vehicle traverses the road segment.

In various embodiments of the presently disclosed technology, a second system is provided. The second system may comprise: (1) one or more processors; and (2) memory storing machine-readable instructions that, when executed by the one or more processors, cause the system to: (a) determine an individual lateral acceleration profile for a first vehicle as the first vehicle traverses a road segment; (b) based on a comparison between the individual lateral acceleration profile for the first vehicle and a historical collective lateral acceleration profile for the road segment, determine the first vehicle changed lanes while traversing the road segment; and (c) responsive to determining the first vehicle changed lanes while traversing the road segment, at least one of: (i) control at least one of the first vehicle and a second vehicle traversing the road segment based on the determined lane change of the first vehicle, or (ii) update a lane-level traffic map for the road segment based on the determined lane change of the first vehicle.

In some embodiments of the second system, the system may comprise a cloud-based system.

In various embodiments of the second system, the system may be implemented on roadside infrastructure adjacent the road segment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict example embodiments.

FIG. 4 illustrates an example process that may be performed by a lane change detection system to detect lane changes, in accordance with various embodiments of the presently disclosed technology.

FIGS. 5A-5D depict example representations of individual and collective vehicle motion profiles, in accordance with various embodiments of the presently disclosed technology.

Figure 1A:
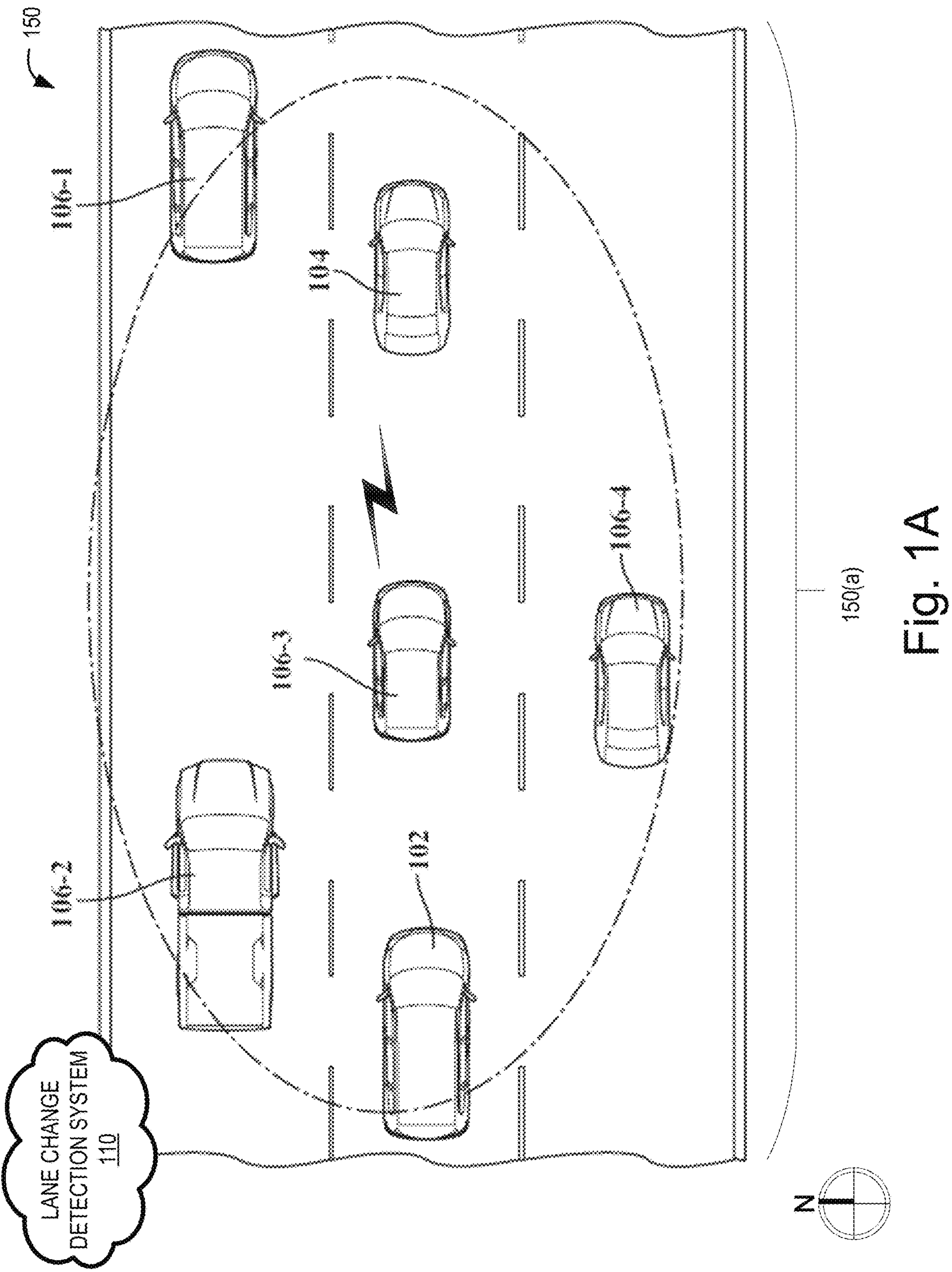
FIGS. 1A-1C illustrate an example road segment over which embodiments of the presently disclosed technology may be implemented.

The figures are not exhaustive and do not limit the present disclosure to the precise form disclosed.

DETAILED DESCRIPTION

As described above, various systems (e.g., lane-level traffic map generation systems and autonomous driving systems) rely on accurate and rapid detection of lane changes by vehicles.

As such, there are various systems dedicated to detecting lane changes on a road segment. Such lane change detection systems can be implemented on the cloud, on roadside infrastructure adjacent the road segment, across one or more vehicle traversing the road segment, or any combination thereof.

There are various existing lane change detection techniques that can be utilized by lane change detection systems. However, many of these existing lane change detection techniques are impractical for systems that require acquiring data from many different vehicles traversing a road segment (e.g., cloud-based systems) as they rely on: (1) premium and uncommon vehicle sensors; (2) transferring large volumes of data/large size signals (such as image data); or (3) some combination of (1) and (2).

For example, certain existing lane change detection techniques rely on vehicles' high-precision GPS sensors (or high-precision maps derived therefrom) to detect lane changes. However, high-precision GPS sensors are generally expensive, and (relatedly) many existing connected vehicles are not equipped with them. Accordingly, it can be impractical/infeasible for systems to detect lane changes via high-precision GPS-based techniques where only a subset of vehicles have the requisite sensors to support them. Relatedly, in various scenarios a high-precision GPS signal may be compromised due to noise/physical obstructions, which can further limit performance for high-precision GPS-based lane change detection techniques.

Other existing lane change detection techniques rely on image data (e.g., image data capturing a vehicle's lateral position relative to lane boundaries) acquired from vehicle cameras/image sensors. However, such image data can be voluminous due in part to large signal size, and thus cumbersome to transfer. This can make it somewhat infeasible/impractical to utilize image data-based techniques in lane change detection systems (e.g., cloud-based systems) where data is being acquired from many different vehicles traversing a road segment.

As embodiments of the presently disclosed technology are designed in appreciation of, lane change detection techniques that utilize vehicle motion-related data present a promising alternative to the above-described lane change detection techniques involving high-precision GPS and image data.

This is in part because motion-based lane change detection techniques can rely on less premium and more common vehicle sensors (e.g., lateral acceleration sensors, heading sensors, yaw rate sensors, accelerometers, steering wheel angle sensors, speed sensors, or some combination thereof). Moreover, motion-related data is typically less voluminous/associated with smaller signals, and thus easier and faster to transfer than image data. As such, motion-based techniques are theoretically more practical to implement for many lane change detection systems as a larger number of vehicles are equipped to support them and the utilized data is easier to transfer.

However, a shortcoming of motion-based lane change detection techniques is that they can be less accurate on curved road segments. For example, existing motion-based lane change detection techniques may incorrectly detect/determine a vehicle changed lanes on a curved road segment because motion-related data (e.g., lateral acceleration data) acquired from the vehicle while traversing the curved road segment was highly similar to motion-related data that would indicate the vehicle changed lanes on a straight road segment. Relatedly, existing motion-based lane change detection techniques may incorrectly detect/determine a vehicle did not change lanes on a curved road segment because motion-related data acquired from the vehicle while changing lanes on the curved road segment was highly similar to motion-related data that would indicate the vehicle did not change lanes on a straight road segment.

Against this backdrop, the presently disclosed technology provides improved lane change detection systems and methods that utilize vehicle motion-related data in a manner that may be implemented to account for curved road segments. Namely, aspects of the presently disclosed systems and methods can detect a first vehicle changed lanes on a road segment by detecting a mismatch between, for example: (a) a real-time individual motion profile (e.g., a real-time lateral acceleration profile) for the first vehicle as the first vehicle traverses the road segment, and (b) a historical collective motion profile (e.g., a historical collective lateral acceleration profile) for the road segment derived from (e.g., as an average of) historical individual motion profiles (e.g., historical individual lateral acceleration profiles) of other vehicles that traversed the road segment prior to the first vehicle.

The road segment can be selected (e.g., based on historical traffic patterns on the road segment) such that the historical collective motion profile corresponds to a motion profile of a non-lane change on the road segment. For example, the road segment may be a road segment where: (i) a majority of vehicles do not change lanes; (ii) rightward lane changes are roughly as frequent as leftward lane changes—resulting in historical individual motion profiles associated with rightward lane changes counter-balancing historical individual motion profiles associated with leftward lane changes; or (iii) some combination of (i) and (ii). In other words, under conditions (i)-(iii) the historical collective motion profile for a road segment may match/correspond with an individual motion profile of a non-lane change on the road segment.

Thus, even if the road segment is curved and the real-time individual motion profile for the first vehicle would typically indicate a lane change on a straight road segment, systems and methods would only detect a lane change where there is a mismatch (e.g., over a pre-determined threshold deviation) between the real-time individual motion profile for the first vehicle and the historical collective motion profile for the road segment. Relatedly, if the road segment is curved and the real-time individual motion profile for the first vehicle would typically indicate a non-lane change on a straight road segment, systems and methods may still correctly detect a lane change where there is a mismatch (e.g., over a pre-determined threshold deviation) between the real-time individual motion profile for the first vehicle and the historical collective motion profile for the road segment.

Accordingly, under this curved road segment scenario, systems and methods can correctly detect lane changes (or non-lane changes) more accurately than existing motion-based lane change detection systems.

Moreover, the presently disclosed motion-based lane change detection systems and methods may be more practical and less expensive to implement than existing/alternative lane change detection techniques that rely on high-precision GPS or image data. As discussed above, motion-based lane change detection techniques can utilize less premium and more common vehicle sensors (e.g., lateral acceleration sensors, heading sensors, yaw rate sensors, accelerometers, steering wheel angle sensors, speed sensors, or some combination thereof). Relatedly, motion-related data is typically less voluminous/associated with smaller signals, and thus easier to transfer than image data. As such, the presently disclosed motion-based techniques are more practical to implement for many lane change detection systems as a larger number of vehicles are equipped to support them and the utilized data is easier to transfer.

The presently disclosed lane change detection systems and methods can also be incorporated into, and thus improve, related technological systems.

For example, in certain implementations the presently disclosed lane change detection systems and method may be incorporated into (or otherwise integrate/interoperate with) autonomous driving systems to control vehicles based on detected lane changes. As such, the presently disclosed lane change detection systems and methods can improve the function/operation of the autonomous driving systems by facilitating more rapid and improved decision making, and improve such systems' control of vehicles in response to detected lane changes. In turn, these more rapid and improved decisions can improve traffic safety and efficiency.

As another example, in some implementations the presently disclosed lane change detection systems and method may be incorporated into (or otherwise integrate/interoperate with) lane-level traffic map generation/estimation systems to update lane-level traffic maps/estimations in real-time based on detected lane changes. As such, the presently disclosed lane change detection systems and methods can improve the function/operation of the lane-level traffic map generation/estimation systems by facilitating more rapid and accurate updates to lane-level traffic maps/estimations. In turn, these more rapid and accurate lane-level traffic map/estimation updates can inform human drivers and autonomous driving systems to make more rapid and improved decisions, thus also improving traffic safety and efficiency.

Systems and methods are described in greater detail in conjunction with the following Figures.

Figure 1B:
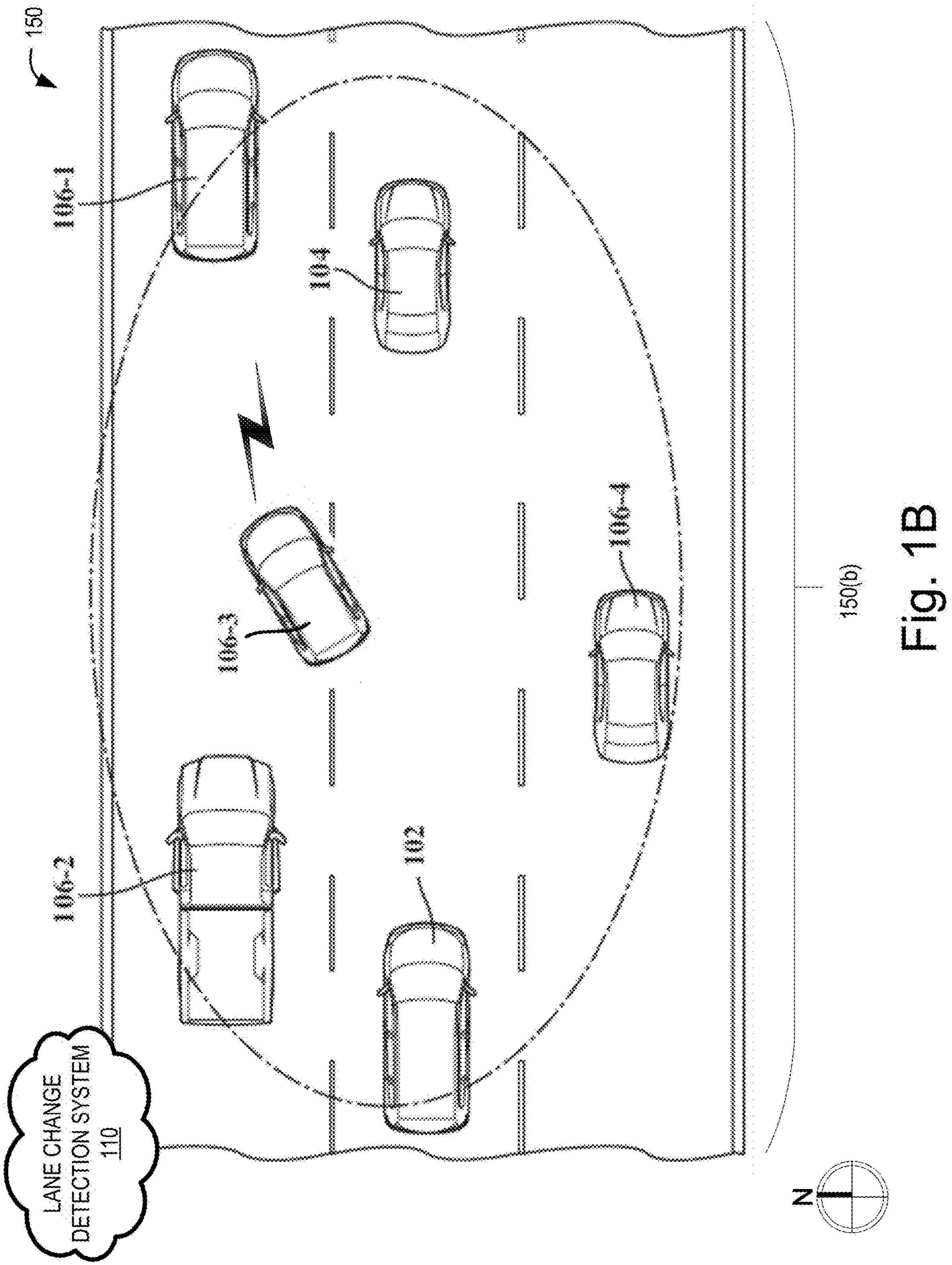
Figure 1C:
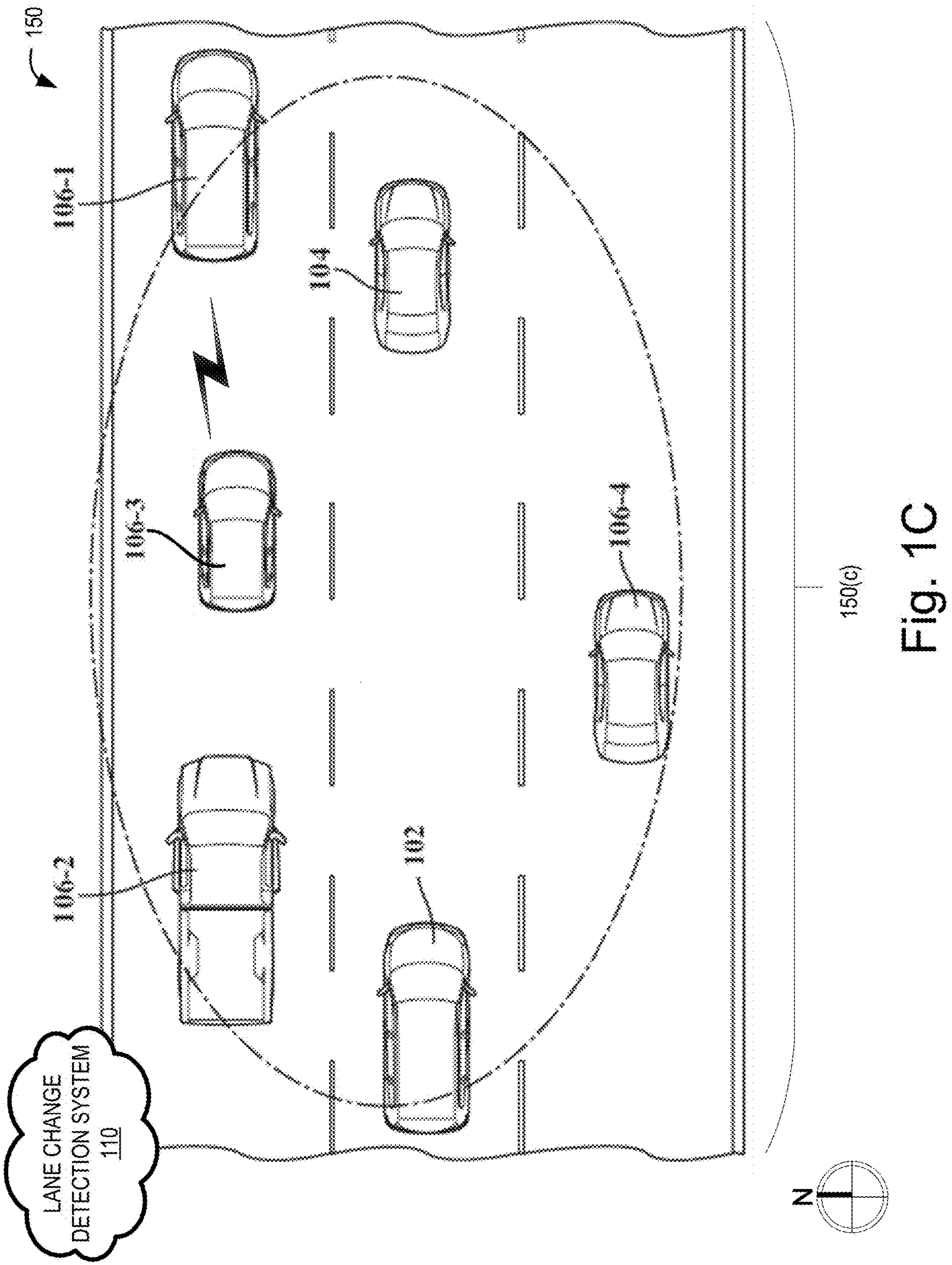

FIGS. 1A-1C illustrate regions of a road segment 150 over which embodiments of the presently disclosed technology may be implemented.

Namely, FIG. 1A illustrates an example region 150(*a*) that vehicles 102, 104, 106-1, 106-2, 106-3 and 106-4 traverse at a first time $t_1$. FIG. 1B illustrates an example region 150(*b*) that the above-referenced vehicles traverse at a later time t2. FIG. 1C illustrates an example region 150(*c*) that the above-referenced vehicles traverse at a later time $t_3$. As depicted, vehicle 106-3 may change lanes on road segment 150 (i.e., from the middle lane to the left lane) between time $t_1$ and $t_3$.

As depicted, vehicle 106-3 may communicate with a lane change detection system 110. In certain implementations, lane change detection system 110 may be implemented as a cloud-based system. In other implementations, lane change detection system 110 may be implemented on roadside infrastructure adjacent road segment 150, or across one or more of vehicles 102, 104, 106-1, 106-2, 106-3 and 106-4. In still further implementations, lane change detection system 110 may be implemented across any combination of the cloud, roadside infrastructure adjacent road segment 150, and one or more of vehicles 102, 104, 106-1, 106-2, 106-3 and 106-4.

Vehicle 106-3 can transmit real-time operational state data to lane change detection system 110 as vehicle 106-3 traverses road segment 150. Such real-time operational state data may include real-time motion-related data of vehicle 106-3. For example, lane change detection system 110 may acquire any combination of: (a) real-time lateral acceleration data of vehicle 106-3 as vehicle 106-3 traverses road segment 150; (b) real-time yaw rate data of vehicle 106-3 as vehicle 106-3 as traverses road segment 150; (c) real-time heading data of vehicle 106-3 as vehicle 106-3 traverses road segment 150; (d) real-time accelerometer data of vehicle 106-3 as vehicle 106-3 traverses road segment 150; (e) real-time steering wheel angle data of vehicle 106-3 as vehicle 106-3 traverses road segment 150; or (f) real-time speed data of vehicle 106-3 as vehicle 106-3 traverses road segment 150.

As described above, transferring this real-time motion-related data can be significantly less cumbersome than transmitting other forms of data, such as image data derived from cameras/image sensors of vehicle 106-3. Thus, by determining lane changes using motion-related data, lane change detection system 110 can be more suitable for lane change detection systems that acquire data from a large number of different vehicles (e.g., cloud-based systems) than alternative systems that rely on transferring large volumes of data/data associated with relatively larger signals (e.g., image data-based systems).

Equipping vehicle 106-3 with sensors that capture motion-related data is also generally less expensive than equipping vehicle 106-3 with high-precision GPS sensors. Relatedly, sensors that capture motion-related data are generally more common on connected vehicles than more expensive, high-precision GPS sensors. Thus, by determining lane changes using motion-related data, lane change detection system 110 can may be compatible with a wider range of different vehicles than alternative systems that rely on more premium/uncommon sensors.

As described above, lane change detection system 110 can determine a real-time individual motion profile for vehicle 106-3 based on the real-time motion-related data acquired from vehicle 106-3 as vehicle 106-3 traverses road segment 150. In various implementations, the real-time individual motion profile for vehicle 106-3 may comprise a representation (e.g., a graphical representation, a mathematical representation, or a combination thereof) of lateral acceleration of vehicle 106-3 as a function of distance over a length of road segment 150.

In some implementations, generating the real-time motion profile for vehicle 106-3 may involve converting raw sensor data (e.g., raw lateral acceleration data, raw heading data, raw yaw rate data, raw accelerometer data, raw steering wheel angle data, raw vehicle speed data, etc.) into the more standardized format of the real-time individual motion profile. Examples of individual and collective motion profiles are depicted and described in greater detail in conjunction with FIGS. 5A-5D.

In certain implementations, determining the real-time individual motion profile for vehicle 106-3 may comprise: (a) correlating real-time GPS data of vehicle 106-3 (this may be relatively low precision GPS data derived from more common/lower precision GPS sensors equipped on vehicles) to map data to determine vehicle 106-3 is traversing road segment 150; and (b) responsive to determining vehicle 106-3 is traversing road segment 150, determining the real-time individual motion profile for vehicle 106-3 based on the real-time motion-related data acquired from vehicle 106-3 as vehicle 106-3 traverses road segment 150.

As alluded to above, lane change detection system 110 can determine vehicle 106-3 changed lanes while traversing road segment 150 by comparing the real-time individual motion profile (e.g., a real-time individual lateral acceleration profile) for vehicle 106-3 to a historical collective motion profile (e.g., a historical collective lateral acceleration profile) for road segment 150.

Lane change detection system 110 can determine the historical collective motion profile by: (i) determining historical individual motion profiles for road segment 150 over time (e.g., over multiple months or years), wherein a respective historical individual motion profile represents motion of a respective vehicle as the respective vehicle traversed road segment 150 at a time prior to vehicle 106-3; and (ii) determining the historical collective motion profile for road segment 150 based on the historical individual motion profiles. Lane change detection system 110 can determine the respective historical individual motion profile for the respective vehicle in the same/similar manner as described above for the real-time individual motion profile for vehicle 106-3. In some implementations, determining the historical collective motion profile for road segment 150 based on the historical individual motion profiles may comprise computing the historical collective motion profile as an average (e.g., a statistical mean) of the historical individual motion profiles.

In various implementations, determining vehicle 106-3 changed lanes while traversing road segment 150 may comprise: (i) using a statistical model to detect a mismatch between the real-time individual motion profile for vehicle 106-3 and the historical collective motion profile for road segment 150; and (ii) determining vehicle 106-3 changed lanes based on the detected mismatch. In some of such implementations, the statistical model may comprise an autoregressive integrated moving average (ARIMA) model.

In other implementations, determining vehicle 106-3 changed lanes while traversing road segment 150 may comprise: (i) using a statistical model (e.g., an ARIMA model) to detect a mismatch between the real-time individual motion profile for vehicle 106-3 and the historical collective motion profile for road segment 150; (ii) identifying vehicle 106-3 as a potential lane change candidate for road segment 150 based on the detected mismatch; and (iii) responsive to identifying vehicle 106-3 as the potential lane change candidate, verifying vehicle 106-3 changed lanes while traversing road segment 150 using analysis of additional data. To conserve network resources/bandwidth, in some of such implementations lane change detection system 110 may only acquire the additional data responsive to identifying vehicle 106-3 as the potential lane change candidate. In certain implementations, the additional data may comprise at least one of: (a) real-time turning signal operation data acquired from vehicle 106-3 (e.g., from a turning signal operation sensor of vehicle 106-3) as vehicle 106-3 traverses road segment 150; (b) real-time lateral position data acquired from vehicle 106-3 as vehicle 106-3 traverses the road segment; (c) real-time image data acquired from vehicle 106-3 as vehicle 106-3 traverses road segment 150; or (d) real-time image data acquired from one or more of vehicles 102, 104, 106-1, 106-2 and 106-4 as these vehicles traverse road segment 150 with vehicle 106-3. Here, the real-time image data acquired from vehicle 106-3 may indicate vehicle 106-3's lateral position relative to lane boundaries of road segment 150 as vehicle 106-3 traverses road segment 150. Likewise, the real-time image data acquired from one or more of vehicles 102, 104, 106-1, 106-2 and 106-4 may indicate vehicle 106-3's lateral position relative to lane boundaries of road segment 150 as vehicle 106-3 traverses road segment 150. As described above, to conserve network resources/bandwidth, in some of such implementations, lane change detection system 110 may only acquire such real-time image data responsive to identifying vehicle 106-3 as the potential lane change candidate.

In various implementations, responsive to determining vehicle 106-3 changed lanes while traversing road segment 150, lane change detection system 110 can at least one of: (1) control at least one of vehicles 102, 104, 106-1, 106-2, 106-3 and 106-4 based on the determined lane change of vehicle 106-3; or (2) update a lane-level traffic map for road segment 150 based on the determined lane change of vehicle 106-3. In other implementations, lane change detection system 110 can instead provide the lane change determination to one or more autonomous driving systems implemented on the vehicles traversing road segment 150. In still further implementations lane change detection system 110 can provide the lane change determination to a lane-level traffic map generation system-which in turn updates a lane-level traffic map. The above-described autonomous driving systems, as well as human drivers, may then make improved decisions based on the updated lane-level traffic map.

Figure 2:
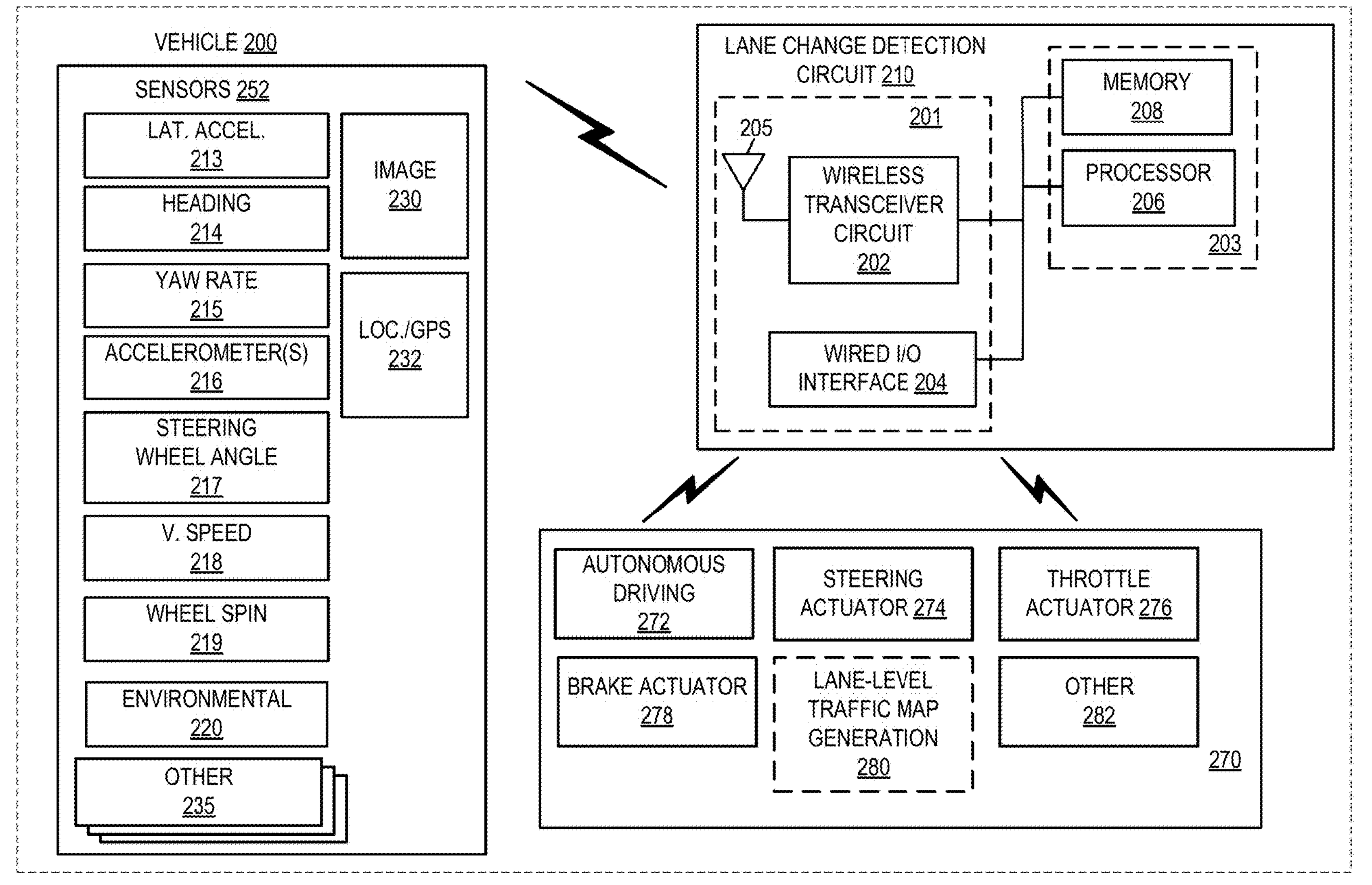
FIG. 2 illustrates an example vehicle, in accordance with various embodiments of the presently disclosed technology.

FIG. 2 illustrates an example vehicle 200, in accordance with various embodiments of the presently disclosed technology. Vehicle 200 may be an example of any of the vehicles depicted and described in conjunction with FIGS. 1A-1C.

As depicted, vehicle 200 comprises a lane change detection circuit 210, sensors 252, and additional vehicle systems 270. Sensors 252 and additional vehicle systems 270 can communicate with lane change detection circuit 210 via a wired or wireless communication interface. Although sensors 252 and additional vehicle systems 270 are depicted as communicating with lane change detection circuit 210, they can also communicate with each other. Lane change detection circuit 210 can be implemented as an electronic control unit (ECU) or as part of an ECU. In other embodiments, lane change detection circuit 210 can be implemented independently of an ECU.

In the specific example of FIG. 2, lane change detection circuit 210 includes a communication circuit 201 and a decision circuit 203 (including a processor 206 and a memory 208). Components of lane change detection circuit 210 are illustrated as communicating with each other via a data bus, although other interfaces can be included.

Processor 206 can include one or more general processing units (GPUs), central processing units (CPUs), microprocessors, or any other suitable processing system. Processor 206 may include a single core processor or multicore processors. Memory 208 can be made up of one or more modules of one or more different types of memory (e.g., flash, RAM, etc.) that may be used to store data related to lane change detection algorithms, data related to detecting lane changes, statistical model parameters, instructions and variables for processor 206, as well as any other suitable information.

Although the example of FIG. 2 is illustrated using processor and memory circuitry, in various embodiments decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up lane change detection circuit 210.

Communication circuit 201 can utilize a wireless transceiver circuit 202 with an associated antenna 205 for wireless communication. Communication circuit 201 can also utilize a wired I/O interface 204 with an associated hardwired data port (not illustrated). As this example illustrates, communications with lane change detection circuit 210 can include either or both wired and wireless communications. Wireless transceiver circuit 202 can include a transmitter and a receiver to allow wireless communications via any of a number of communication protocols such as, for example, Wifi, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and can be used by wireless transceiver circuit 202 to transmit radio signals wirelessly to wireless equipment and to receive radio signals as well. These radio signals can include information of almost any sort that is sent or received by lane change detection circuit 210 to/from other entities such as sensors 252, additional vehicle systems 270, other vehicles, connected roadside infrastructure, cloud computing entities, remote servers, etc.

Wired I/O interface 204 may include a transmitter and a receiver for hardwired communications with other devices. For example, wired I/O interface 204 can provide a hardwired interface to other components, including sensors 252 and additional vehicle systems 270. Wired I/O interface 204 can communicate with other devices using Ethernet or any of a number of other wired communication protocols whether standardized, proprietary, open, point-to-point, networked or otherwise.

In certain implementations, decision circuit 203 and communication circuit 201 may be used for computation, memory, or communication tasks beyond lane change detection. In some implementations, vehicle 200 may comprise additional processing, memory, or communication resources (not depicted) devoted to these other tasks.

Sensors 252 can include, for example, lateral acceleration sensor(s) 213, heading sensor(s) 214, yaw rate sensor(s) 215, accelerometer(s) 216, steering wheel angle/position sensor(s) 217 (e.g., one or more sensors to detect angle/position of a steering wheel of vehicle 200), and vehicle speed sensor(s) 218 (e.g., one or more sensors to detect speed of vehicle 200). Sensors 252 may also include wheel-spin sensor(s) 219 (e.g., one for each wheel), environmental sensor(s) 220 (e.g., to detect salinity or other environmental conditions), image sensor(s) 230, and location sensor(s) 232. Other sensors 235 can also be included as may be appropriate for a given implementation of vehicle 200. For example, other sensors 235 may include proximity sensors such as radar sensors, LiDAR sensors, sonar sensors, etc.

In some embodiments, image sensor(s) 230 may comprise one or more cameras (e.g., monocular cameras, stereoscopic cameras, RGB cameras, infrared cameras, etc.) configured to obtain image data of an environment surrounding vehicle 200. As discussed above, in certain implementations such image data can be used to verify/determine a lane change for an identified potential lane change candidate.

In certain embodiments, location sensor(s) 232 may comprise a global navigation satellite sensor, a global position sensor, or other types of vehicle positioning sensors. Location sensor(s) 232 may be configured to generate location data for vehicle 200 and/or location data for landmarks in the environment surrounding vehicle 200 (e.g., intersections or corners of a road). The location data may comprise approximate coordinates (e.g., latitude, longitude, and altitude) of vehicle 200's position on the Earth's surface. As discussed above, in certain implementations such location data can be used to determine vehicle 200 is traversing a respective road segment.

In some embodiments, one or more of sensors 252 may include their own processing capability to compute the results for additional information that can be provided to lane change detection circuit 210. In other embodiments, one or more of sensors 252 may be data-gathering-only sensors that only provide raw data to lane change detection circuit 210. In further embodiments, one or more hybrid sensors may be included that provide a combination of raw data and processed data to lane change detection circuit 210. Sensors 252 may provide analog outputs, digital outputs, or a combination of both.

Additional vehicle systems 270 can include any of a number of different vehicle components or subsystems used to control or monitor various aspects of vehicle 200 and its performance. For example, additional vehicle systems 270 may include any one or combination of an autonomous driving system 272, a steering actuator 274, a throttle actuator 276, a brake actuator 278, a lane-level traffic map generation system 280 and other vehicle systems 282. Here other vehicle systems 282 may comprise various other types of vehicle systems utilized in the operation of vehicle 200.

As alluded to above, in certain implementations, lane change detection circuit 210 can provide a detected/determined lane change to autonomous driving system 272. In turn, autonomous driving system 272 can autonomously control vehicle 200 based on the detected/determined lane change using one or more of steering actuator 274, throttle actuator 276 and brake actuator 278. In some implementations, lane change detection circuit 210 can additionally (or alternatively) provide the detected/determined lane change to lane-level traffic map generation system 280. In turn, lane-level traffic map generation system 280 can update a lane-level traffic map based on the detected/determined lane change. In some of such implementations, autonomous driving system 272 can use the updated lane-level traffic map to make improved decisions (e.g., changing lanes to avoid a traffic back-up, changing lanes to avoid a potential collision, etc.).

Figure 3:
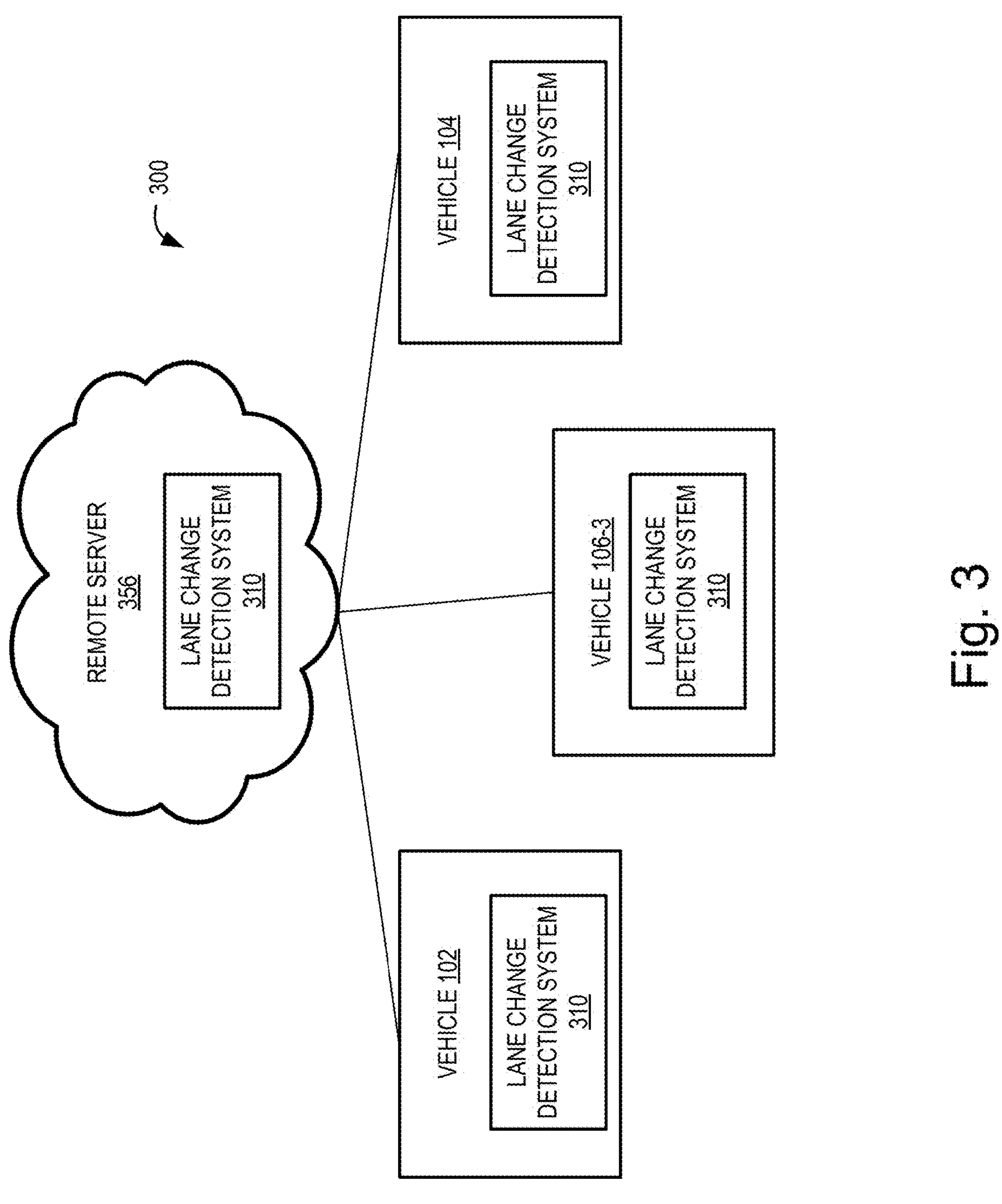
FIG. 3 illustrates an example implementation of a lane change detection system, in accordance with various embodiments of the presently disclosed technology.

FIG. 3 depicts an example lane change detection system 310, in accordance with various embodiments of the presently disclosed technology. Lane change detection system 310 be an example of lane change detection system 110 from FIGS. 1A-1C.

As depicted in FIG. 3, in some embodiments lane change detection system 310 may be implemented across a remote server 356 and one or more vehicles traversing a road segment, such as vehicle 102, vehicle 104, and vehicle 106-3 from FIGS. 1A-1C. Such embodiments may be facilitated by a remote environment 300. In some embodiments, remove environment 300 may comprise a cloud-based environment. In other embodiments, remote environment 300 may comprise an edge-based environment. Such an edge-based environment can utilize various types of edge infrastructure, such as roadside/traffic infrastructure, cellular network infrastructure, etc. In some implementations, remote environment 300 may be a combination of a cloud-based environment and an edge-based environment.

Accordingly, lane change detection system 310 may include separate instances within one or more entities of remote environment 300, such as remote server 356, vehicle 102, vehicle 104, and vehicle 106-3. In a further aspect, the entities that implement lane change detection system 310 within remote environment 300 may vary beyond transportation-related devices and encompass roadside infrastructure elements. Thus, the set of entities that function in coordination with remote environment 300 may be varied.

In some embodiments, remote environment 300 itself may comprise a dynamic environment that comprises cloud members that migrate into and out of a geographic area.

FIG. 4 illustrates an example process 400 that may be performed by lane change detection system 310 to detect lane changes, in accordance with various embodiments of the presently disclosed technology.

As depicted, lane change detection system 310 can perform operation 402 to determine an individual motion profile (sometimes referred to herein as a real-time individual motion profile) for a first vehicle as the first vehicle traverses a road segment. In certain scenarios, the road segment may comprise a curved road segment.

In various implementations, the individual motion profile for the first vehicle may comprise a representation of lateral acceleration of the first vehicle as a function of distance over a length of the road segment. However, in other implementations the individual motion profile for the first vehicle may comprise a representation of other motion-related characteristics, such as heading, yaw rate, change in steering wheel angle position or rate, etc.

In certain implementations, determining the individual motion profile for the first vehicle may comprise: (a) correlating real-time GPS data of the first vehicle to map data including the road segment to determine the first vehicle is traversing the road segment; and (b) responsive to determining the first vehicle is traversing the road segment, determining the individual motion profile for the first vehicle based on real-time motion-related data acquired from the first vehicle as the first vehicle traverses the road segment. In some of such implementations, the real-time motion data may comprise at least one of: (i) real-time lateral acceleration data of the first vehicle as the first vehicle traverses the road segment; (ii) real-time yaw rate data of the first vehicle as the first vehicle traverses the road segment; (iii) real-time heading data of the first vehicle as the first vehicle traverses the road segment; (iv) real-time accelerometer data of the first vehicle as the first vehicle traverses the road segment; (v) real-time steering wheel angle data of the first vehicle as the first vehicle traverses the road segment; or (vi) real-time speed data of the first vehicle as the first vehicle traverses the road segment.

Based on a comparison between the individual motion profile (e.g., a real-time individual lateral acceleration profile) for the first vehicle and a historical collective motion profile (e.g., a historical collective lateral acceleration profile) for the road segment, lane change detection system 310 can perform operation 404 to determine the first vehicle changed lanes while traversing the road segment.

As described above, in some implementations, lane change detection system 310 can determine the historical collective motion profile by: (a) determining historical individual motion profiles for the road segment over time (e.g., over multiple months or years), wherein a respective historical individual motion profile represents motion of a respective vehicle as the respective vehicle traversed the road segment at a time prior to the first vehicle; and (b) determining the historical collective motion profile for the road segment based on the historical individual motion profiles. In certain of such implementations, determining the historical collective motion profile for the road segment based on the historical individual motion profiles may comprise computing the historical collective motion profile as an average (e.g., a statistical mean) of the historical individual motion profiles.

In various implementations, determining the first vehicle changed lanes while traversing the road segment may comprise: (a) using a statistical model to detect a mismatch between the individual motion profile for the first vehicle and the historical collective motion profile for the road segment; and (b) determining the first vehicle changed lanes based on the detected mismatch. In some of such implementations, the statistical model may comprise an autoregressive integrated moving average (ARIMA) model.

In other implementations, determining the first vehicle changed lanes while traversing the road segment may comprise: (a) using a statistical model to detect a mismatch between the individual motion profile for the first vehicle and the historical collective motion profile for the road segment; (b) identifying the first vehicle as a potential lane change candidate for the road segment based on the detected mismatch; and (c) responsive to identifying the first vehicle as the potential lane change candidate, verifying the first vehicle changed lanes while traversing the road segment using analysis of additional data. Here, the additional data may comprise at least one of: (i) real-time turning signal operation data acquired from the first vehicle as the first vehicle traverses the road segment; (ii) real-time lateral position data acquired from the first vehicle as the first vehicle traverses the road segment; (iii) real-time image data acquired from the first vehicle as the first vehicle traverses the road segment (e.g., real-time image data indicating the first vehicle's lateral position relative to lane boundaries of the road segment); or (iv) real-time image data acquired from other vehicles proximate the first vehicle as the other vehicles traverse the road segment with the first vehicle (e.g., real-time image data indicating the first vehicle's lateral position relative to lane boundaries of the road segment or real-time image data indicating operation of the first vehicle's turning signal).

Responsive to determining the first vehicle changed lanes while traversing the road segment, lane change detection system 310 can perform at least one of: (1) operation 406(*a*) to control at least one of the first vehicle and a second vehicle traversing the road segment based on the determined lane change of the first vehicle; or (2) update a lane-level traffic map for the road segment based on the determined lane change of the first vehicle.

FIGS. 5A-5D depict example representations of individual and collective vehicle motion profiles, in accordance with various embodiments of the presently disclosed technology. As depicted, these representations may be generated (or otherwise determined) by lane change detection system 310.

Figure 5B:
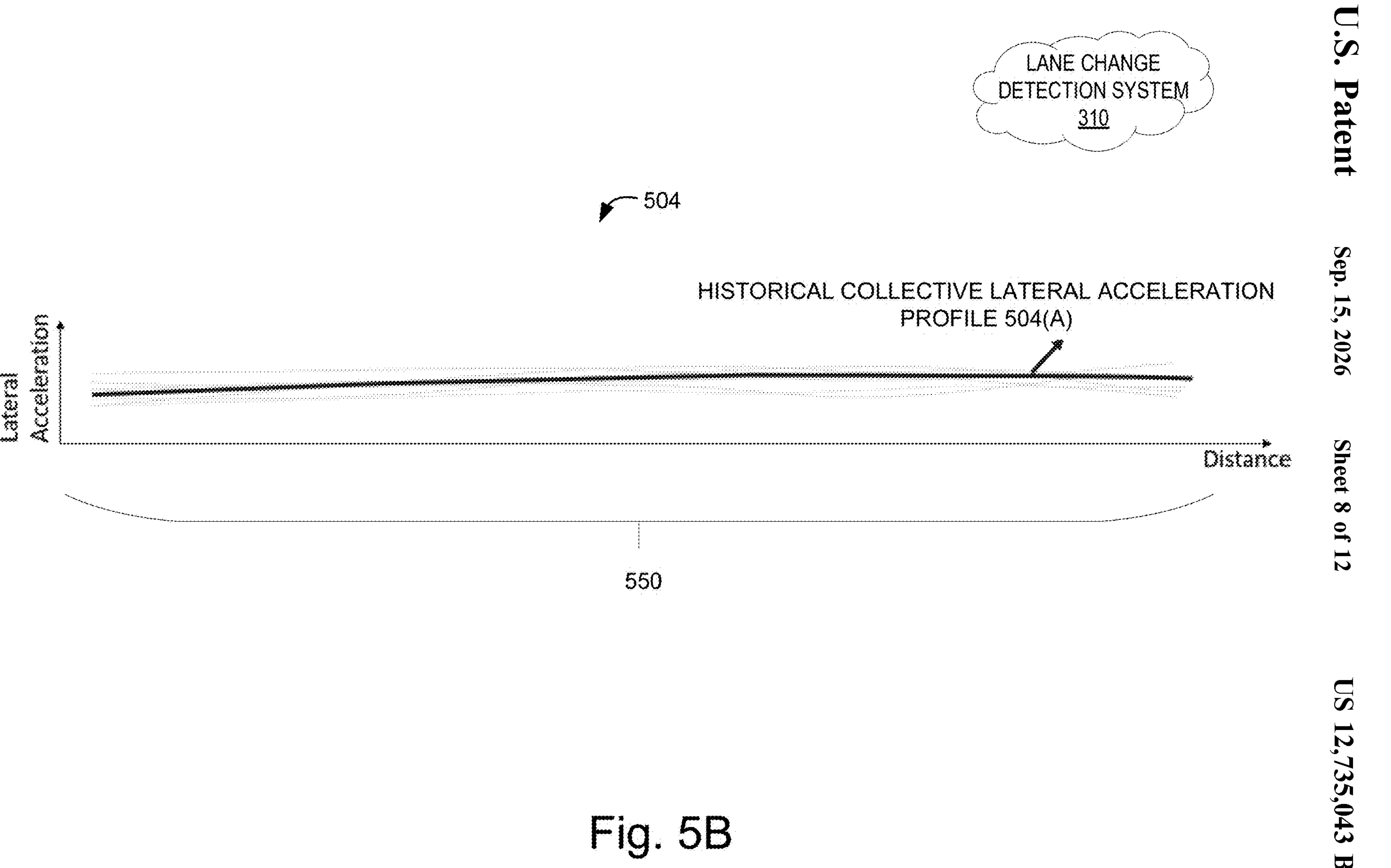

Namely, FIG. 5A depicts a representation 502 of multiple historical individual lateral acceleration profiles for a road segment 550. While lateral acceleration is provided as an illustrative example of motion/motion-related data in FIGS. 5A-5D, it may be appreciated that in other implementations other motion characteristics may be used (e.g., heading, yaw rate, change in steering wheel angle position or rate, etc.).

As depicted, representation 502 includes a historical individual lateral acceleration profile 502(A) associated with a vehicle 541, a historical individual lateral acceleration profile 502(B) associated with a vehicle 542, along with other historical individual lateral acceleration profiles associated with other vehicles that have traversed road segment 550.

As described above, a respective historical individual lateral acceleration profile can represent lateral acceleration of a respective vehicle as the respective vehicle traversed road segment 550. For example, historical individual lateral acceleration profile 502(A) can represent lateral acceleration of vehicle 541 as vehicle 541 traversed road segment 550.

As depicted in the specific example of FIG. 5A, historical individual lateral acceleration profile 502(A) may comprise a graphical representation of vehicle 541's lateral acceleration as a function of distance over a length of road segment 550.

As described above, lane change detection system 310 can generate (or otherwise determine) historical individual lateral acceleration profile 502(A) based on lateral acceleration data acquired from vehicle 541 as vehicle 541 traversed road segment 550. In some implementations, lane change detection system 310 can generate (or otherwise determine) historical individual lateral acceleration profile 502(A) based on other motion-related data (in addition to or alternative to lateral acceleration data). For example, lane change detection system 310 can generate (or otherwise determine) historical individual lateral acceleration profile 502(A) based on any combination of lateral acceleration data, heading data, yaw rate data, accelerometer data, steering wheel angle data, and speed data. The other historical individual lateral acceleration profiles of representation 502 may be generated (or otherwise determined) in the same/similar manner.

As described above, in some implementations lane change detection system 310 can convert raw sensor data acquired from vehicle 541 into the standardized format of historical individual lateral acceleration profile 502(A). In this way, lane change detection system 310 can interoperate with different vehicles that have different types of sensors for recording motion-related data.

FIG. 5B depicts a representation 504 of the multiple historical individual lateral acceleration profiles from FIG. 5A, along with a historical collective lateral acceleration profile 504(A) for road segment 550.

As described above, lane change detection system 310 can generate (or otherwise determine) historical collective lateral acceleration profile 504(A) based on the historical individual lateral acceleration profiles for road segment 550. For example, lane change detection system 310 can compute historical collective lateral acceleration profile 504(A) as an average (e.g., a statistical mean) of the historical individual lateral acceleration profiles for road segment 550.

As described above, road segment 550 may comprise a road segment where: (i) a majority of vehicles do not change lanes; (ii) rightward lane changes are roughly as frequent as leftward lane changes—resulting in historical individual lateral acceleration profiles associated with rightward lane changes counter-balancing historical individual lateral acceleration profiles associated with leftward lane changes; or (iii) some combination of (i) and (ii). In other words, under conditions (i)-(iii) historical collective lateral acceleration profile 504(A) may match/correspond with an individual lateral acceleration profile of a non-lane change on road segment 550.

FIG. 5C depicts a representation 506 of: (1) the multiple historical individual lateral acceleration profiles from FIG. 5A; (2) historical collective lateral acceleration profile 504 (A) from FIG. 5B; and (3) a real-time individual lateral acceleration profile 506(A) for a vehicle 560 traversing road segment 550. Here, lane change detection system 310 can generate (or otherwise determine) real-time individual lateral acceleration profile 506(A) in the same/similar manner described above for historical individual lateral acceleration profile 502(A).

As described above, lane change detection system 310 can determine/detect whether vehicle 560 changed lanes while traversing road segment 550 by comparing real-time individual lateral acceleration profile 506(A) to historical collective lateral acceleration profile 504(A). For example, lane change detection system 310 can: (i) use a statistical model (e.g., an ARIMA model) to detect a match between real-time individual lateral acceleration profile 506 and historical collective lateral acceleration profile 504(A); and (ii) determine vehicle 560 did not change lanes based on the detected match. Relatedly, lane change detection system 310 can: (i) use a statistical model (e.g., an ARIMA model) to detect a mismatch between real-time individual lateral acceleration profile 506 and historical collective lateral acceleration profile 504(A); and (ii) determine vehicle 560 changed lanes based on the detected mismatch.

In the specific example of FIG. 5C, vehicle 560 did not change lanes. Thus real-time individual lateral acceleration profile 506 and historical collective lateral acceleration profile 504(A) closely match, and lane change detection system 310 would determine vehicle 560 did not change lanes while traversing road segment 550.

Figure 5D:
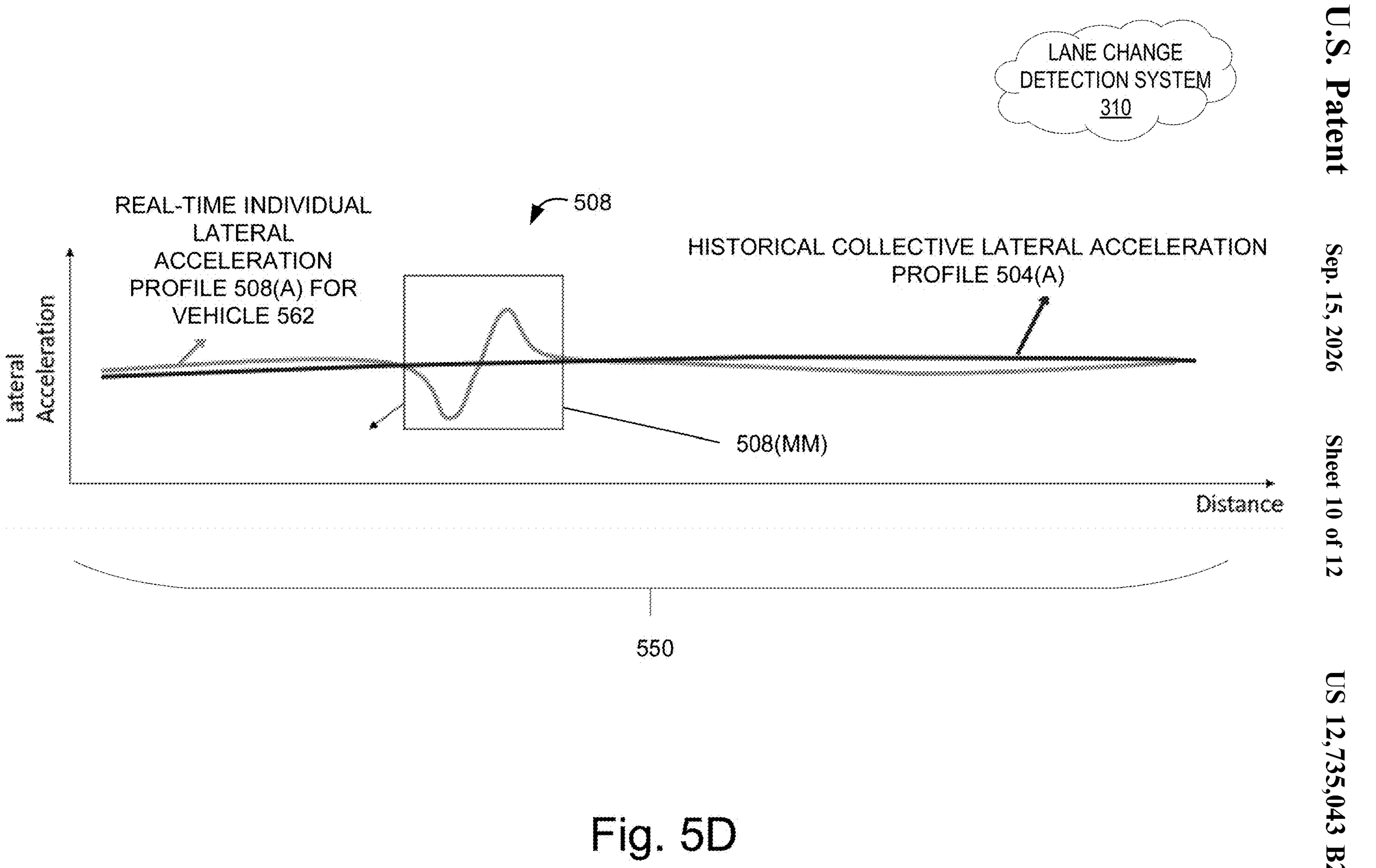

FIG. 5D depicts a representation 508 similar to representation 506 from FIG. 5C.

Namely, FIG. 5D also depicts historical collective lateral acceleration profile 504(A) from FIG. 5B along with a real-time individual lateral acceleration profile 508(A) for a vehicle 562 traversing road segment 550.

In the specific example of FIG. 5D, vehicle 562 changed lanes while traversing road segment 550. Accordingly, there is a significant mismatch between real-time individual lateral acceleration profile 508(A) and historical collective lateral acceleration profile 504(A) (highlighted as a region of representation 508(MM)). As described above, lane change detection system 310 may detect this mismatch (e.g., using a statistical model), and correctly determined vehicle 562 changed lanes while traversing road segment 550.

Figure 6:
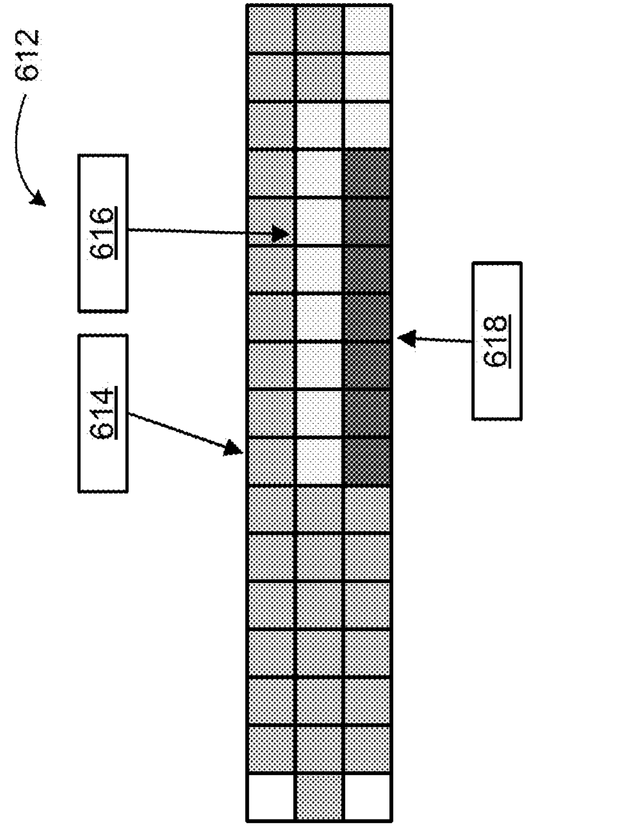
FIG. 6 illustrates an example lane-level traffic map, in accordance with various embodiments of the presently disclosed technology.

FIG. 6 illustrates an example lane-level traffic map 612, in accordance with various embodiments of the presently disclosed technology.

In the specific example of FIG. 6, lane-level traffic map 612 comprises three rows and numerous columns to signify locations within each lane of a road segment. Furthermore, lane-level traffic map 612 shows three distinct shades of grey. Namely, cells 614 are light grey to signify regions where traffic speed is traveling approximately at the speed limit. Cells 616 are white to signify regions where there is free flowing traffic. In other implementations, colors of lane-level traffic map 612 may reflect other parameters, such as density of traffic.

It should be appreciated that lane-level traffic map 612 is merely provided as an illustrative example, and does not limit the foregoing disclosure.

Figure 7:
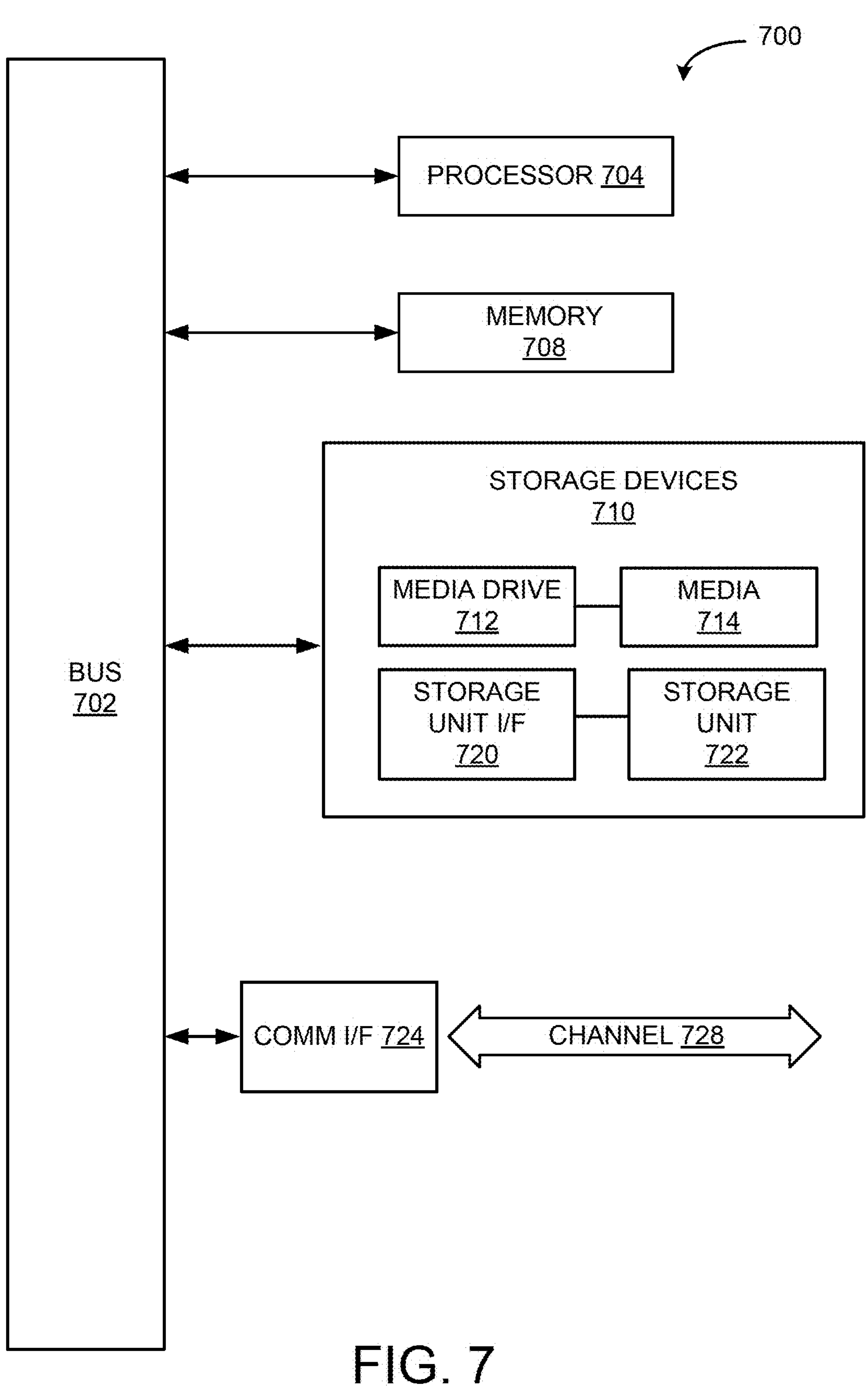
FIG. 7 illustrates an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up a user device, a user system, and a non-decrypting cloud service. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or another interface). Other examples include a communications port (such as for example, a USB port, IR port, RS232 port Bluetooth® interface, or other port), or other communications interfaces. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is target or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

determining an individual motion profile for a first vehicle as the first vehicle traverses a road segment;

based on a comparison between the individual motion profile for the first vehicle and a historical collective motion profile for the road segment, determining the first vehicle changed lanes while traversing the road segment; and responsive to determining the first vehicle changed lanes while traversing the road segment, at least one of:

controlling at least one of the first vehicle or a second vehicle traversing the road segment based on the determined lane change of the first vehicle, or updating a lane-level traffic map for the road segment based on the determined lane change of the first vehicle.

2. The method of claim 1, further comprising determining the historical collective motion profile by:

determining historical individual motion profiles for the road segment over time, wherein a respective historical individual motion profile represents motion of a respective vehicle as the respective vehicle traversed the road segment at a time prior to the first vehicle; and determining the historical collective motion profile for the road segment based on the historical individual motion profiles.

3. The method of claim 2, wherein determining the historical collective motion profile for the road segment based on the historical individual motion profiles comprises computing the historical collective motion profile as an average of the historical individual motion profiles.

4. The method of claim 3, wherein:

the individual lateral acceleration profile for the first vehicle comprises a representation of lateral acceleration of the first vehicle as a function of distance over a length of the road segment; and the respective historical individual motion profile comprises a representation of lateral acceleration of the respective vehicle as the respective vehicle traversed the road segment at the time prior to the first vehicle.

5. The method of claim 1, wherein determining the individual motion profile for the first vehicle comprises:

correlating real-time GPS data of the first vehicle to map data including the road segment to determine the first vehicle is traversing the road segment; and responsive to determining the first vehicle is traversing the road segment, determining the individual motion profile for the first vehicle based on real-time motion-related data acquired from the first vehicle as the first vehicle traverses the road segment.

6. The method of claim 5, wherein the real-time motion-related data comprises at least one of:

real-time lateral acceleration data of the first vehicle as the first vehicle traverses the road segment;

real-time yaw rate data of the first vehicle as the first vehicle traverses the road segment;

real-time heading data of the first vehicle as the first vehicle traverses the road segment;

real-time accelerometer data of the first vehicle as the first vehicle traverses the road segment;

real-time steering wheel angle data of the first vehicle as the first vehicle traverses the road segment; or real-time speed data of the first vehicle as the first vehicle traverses the road segment.

7. The method of claim 1, wherein determining the first vehicle changed lanes while traversing the road segment comprises:

using a statistical model to detect a mismatch between the individual motion profile for the first vehicle and the historical collective motion profile for the road segment; and determining the first vehicle changed lanes based on the detected mismatch.

8. The method of claim 7, wherein the statistical model comprises an autoregressive integrated moving average (ARIMA) model.

9. The method of claim 1, wherein determining the first vehicle changed lanes while traversing the road segment comprises:

using a statistical model to detect a mismatch between the individual motion profile for the first vehicle and the historical collective motion profile for the road segment;

identifying the first vehicle as a potential lane change candidate for the road segment based on the detected mismatch; and responsive to identifying the first vehicle as the potential lane change candidate, verifying the first vehicle changed lanes while traversing the road segment using analysis of additional data.

10. The method of claim 9, wherein the additional data comprises at least one of:

real-time turning signal operation data acquired from the first vehicle as the first vehicle traverses the road segment;

real-time lateral position data acquired from the first vehicle as the first vehicle traverses the road segment;

real-time image data acquired from the first vehicle as the first vehicle traverses the road segment; or real-time image data capturing the first vehicle, acquired from other vehicles proximate the first vehicle as the other vehicles traverse the road segment with the first vehicle.

11. The method of claim 10, wherein the real-time image data capturing the first vehicle, acquired from the other vehicles, comprises at least one of:

real-time image data capturing operation of a turning signal of the first vehicle; or real-time image data capturing lateral position of the first vehicle relative to lane boundaries of the road segment.

12. The method of claim 1, wherein the road segment comprises a curved road segment.

13. A system comprising:

one or more processors; and memory storing machine-readable instructions that, when executed by the one or more processors, cause the system to:

determine an individual motion profile for a first vehicle as the first vehicle traverses a road segment;

based on a comparison between the individual motion profile for the first vehicle and a historical collective motion profile for the road segment, determine the first vehicle changed lanes while traversing the road segment; and responsive to determining the first vehicle changed lanes while traversing the road segment, control at least one of the first vehicle or a second vehicle traversing the road segment based on the determined lane change of the first vehicle.

14. The system of claim 13, wherein the memory stores further machine-readable instructions that, when executed by the one or more processors, cause the system to:

determine historical individual motion profiles for the road segment over time, wherein a respective historical individual motion profile represents motion of a respective vehicle as the respective vehicle traversed the road segment at a time prior to the first vehicle; and determine the historical collective motion profile for the road segment based on the historical individual motion profiles.

15. The system of claim 14, wherein determining the historical collective motion profile for the road segment based on the historical motion acceleration profiles comprises computing the historical collective motion profile as an average of the historical individual motion profiles.

16. The system of claim 13, wherein determining the individual motion profile for the first vehicle comprises:

correlating real-time GPS data of the first vehicle to map data including the road segment to determine the first vehicle is traversing the road segment; and responsive to determining the first vehicle is traversing the road segment, determining the individual motion profile for the first vehicle based on real-time motion-related data acquired from the first vehicle as the first vehicle traverses the road segment.

17. The system of claim 16, wherein the real-time motion-related data comprises at least one of:

real-time lateral acceleration data of the first vehicle as the first vehicle traverses the road segment;

real-time yaw rate data of the first vehicle as the first vehicle traverses the road segment;

real-time heading data of the first vehicle as the first vehicle traverses the road segment;

real-time accelerometer data of the first vehicle as the first vehicle traverses the road segment;

real-time steering wheel angle data of the first vehicle as the first vehicle traverses the road segment; or real-time speed data of the first vehicle as the first vehicle traverses the road segment.

18. A system comprising:

one or more processors; and memory storing machine-readable instructions that, when executed by the one or more processors, cause the system to:

determine an individual lateral acceleration profile for a first vehicle as the first vehicle traverses a road segment;

based on a comparison between the individual lateral acceleration profile for the first vehicle and a historical collective lateral acceleration profile for the road segment, determine the first vehicle changed lanes while traversing the road segment; and responsive to determining the first vehicle changed lanes while traversing the road segment, at least one of:

control at least one of the first vehicle and a second vehicle traversing the road segment based on the determined lane change of the first vehicle, or update a lane-level traffic map for the road segment based on the determined lane change of the first vehicle.

19. The system of claim 18, wherein the system is a cloud-based system.

20. The system of claim 18, wherein the system is implemented on roadside infrastructure adjacent the road segment.

* * * * *